No. 877,846. PATENTED JAN. 28, 1908.
G. KOFFSKEY.
MICROMETER ATTACHMENT FOR MEASURING TOOLS.
APPLICATION FILED SEPT. 7, 1907.
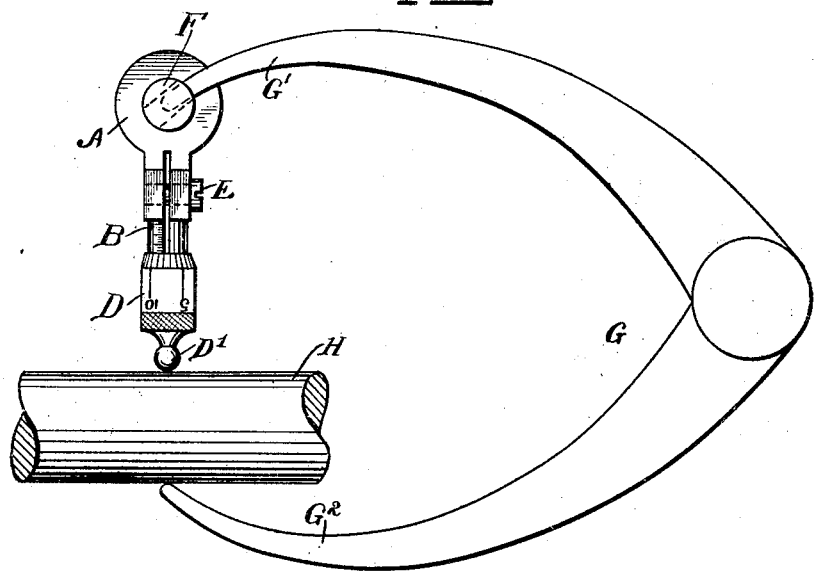
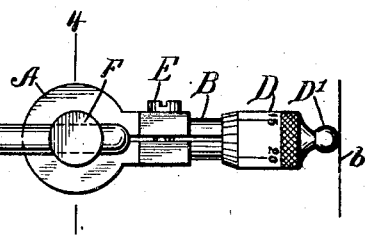
WITNESSES
INVENTOR
George Koffskey.
BY
ATTORNEYS

UNITED STATES PATENT OFFICE.

GEORGE KOFFSKEY, OF NEW ORLEANS, LOUISIANA.

MICROMETER ATTACHMENT FOR MEASURING-TOOLS.

No. 877,846.　　　　Specification of Letters Patent.　　　　Patented Jan. 28, 1908.

Application filed September 7, 1907. Serial No. 391,795.

*To all whom it may concern:*

Be it known that I, GEORGE KOFFSKEY, a citizen of the United States, and a resident of New Orleans, in the parish of Orleans and State of Louisiana, have invented a new and Improved Micrometer Attachment for Measuring-Tools, of which the following is a full, clear, and exact description.

The object of the invention is to provide a new and improved micrometer attachment for measuring tools, such as inside calipers, outside calipers, measuring rods and other measuring tools, and arranged to enable the user of the tool to accurately set the same to a desired measurement.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied to an outside caliper; Fig. 2 is a like view of the improvement as applied to a measuring rod; Fig. 3 is a sectional side elevation of the improvement as applied to an inside caliper, and Fig. 4 is a cross section of the improvement on the line 4—4 of Fig. 2.

The frame-supporting member A of the micrometer is provided with a split hub B having an interior screw thread in which screws the screw rod C carrying the thimble D extending over the hub B in the usual manner. The thimble D and the hub B are provided with the usual graduations for indicating a desired measurement. A clamping screw E engages the split hub B, so as to securely clamp the hub B on the screw rod C after the thimble D is adjusted, to indicate the desired measurement. The free end of the thimble D terminates in a contacting knob D', for contact with the article to be measured, as hereinafter more fully explained. A clamping bolt F having an opening therethrough is held on the frame or supporting member A, for screwing the latter to the measuring tool, the tool passing through the opening for instance, as shown in Fig. 1, the clamping bolt F is engaged with the free end of the member G' of an outside caliper G to screw the micrometer attachment in position on the said member G'.

Now by reference to Fig. 1 it will be seen that the knob D' extends towards the free end of the other member G² of the caliper G, and by adjusting the thimble D the part H can be accurately measured, as the knob D' forms one contact point and the free end of the member G² forms the other contact point, as will be readily understood by reference to Fig. 1.

As illustrated in Fig. 2 the clamping bolt F is engaged with one end of the measuring rod I, so that the other end of the rod I forms one contact or measuring point, while the knob D' forms the other contact or measuring point, to allow of conveniently measuring the distance between the points *a* and *b*.

As indicated in Fig. 3 the clamping bolt F is connected with the member J' of an outside caliper J, and in this case the micrometer attachment extends outwardly away from the free end of the other member J² of the caliper J. Thus by the arrangement described the article K can be calipered at its inside, and proper adjustment or setting of the micrometer is had by turning the thimble D in the usual manner.

The micrometer attachment is very simple and durable in construction and can be readily attached to or detached from an inside or outside caliper, measuring rod or other measuring tool.

Having thus described my invention, I claim as new and desire to secure by Letters Patent:

1. A micrometer attachment, comprising a supporting member having an interiorly threaded split hub, a rod threaded into the hub, a thimble carried by the rod and extending over the hub, the free end of said thimble being provided with a contact knob, said thimble and hub being provided with graduations for the purpose set forth, a clamping screw engaging the split hub to clamp the hub on the rod and a clamping bolt on the supporting member for securing the attachment to the measuring tool.

2. A micrometer attachment, comprising a supporting member having a hub, a rod threaded into the hub, a thimble carried by the rod and extending over the hub, the free end of the thimble being provided with a contact knob, said thimble and hub being provided with graduations for the purpose set forth, means for clamping the hub on the rod, and a clamping bolt on the supporting member for securing the attachment to the measuring tool.

In testimony whereof I have signed my name to this specification in the presence of two subscribing witnesses.

GEORGE KOFFSKEY.

Witnesses:
ELSIE E. HOOPER,
L. W. KOFFSKEY.